United States Patent [19]
Sparrendahl

[11] 3,736,508
[45] May 29, 1973

[54] MODULATOR AND DEMODULATOR RESPECTIVELY FOR USE IN ADAPTIVE DELTA MODULATION

[75] Inventor: Gunnar Erik William Sparrendahl, Handen, Sweden

[73] Assignee: Telefonaktiebolaget LM Ericsson, Stockholm, Sweden

[22] Filed: May 13, 1971

[21] Appl. No.: 143,108

[30] Foreign Application Priority Data

June 5, 1970 Sweden ................................7824/70

[52] U.S. Cl. ................325/38 B, 325/38 R, 325/142, 329/104, 332/11 D

[51] Int. Cl. ................................................H04b 1/00

[58] Field of Search...................325/38 B, 38 R, 141, 325/142; 332/11 D; 329/104, 106; 179/15 AZ

[56] References Cited

UNITED STATES PATENTS 3,633,170 1/1972 Jones ................................325/38 B

*Primary Examiner*—Albert J. Mayer
*Attorney*—Hane, Baxley & Spiecens

[57] ABSTRACT

A delta modulator and delta demodulator respectively generate a synthetized analog signal by supplying to an integration circuit a signal pulse train which consists of pulses having a constant amplitude value, a polarity which is dependent on the polarity of an instantaneous pulse and a varying duration which is dependent on a previous pulse pattern in a delta modulated pulse train. The signal pulse train is generated in a circuit arrangement including a first counting circuit, a second counting circuit, a logical circuit and a gate. In the first counting circuit at each pulse in the delta modulated pulse train there is detected and registered the instantaneous pulse polarity and a digit value which defines the polarity pattern of a number of pulses in the delta modulated pulse train. The logical circuit is connected to the first counting circuit and to the second counting circuit which terminates a counting cycle during a pulse period in the delta modulated pulse train, and produces control signals whose length is dependent on the registered digit value. From the first counting circuit, through the gate which is opened during the control signals, pass signals with a constant amplitude value and a polarity which is dependent on the registered instantaneous polarity, which latter signals form the signal pulse train.

9 Claims, 6 Drawing Figures

Figure 1:
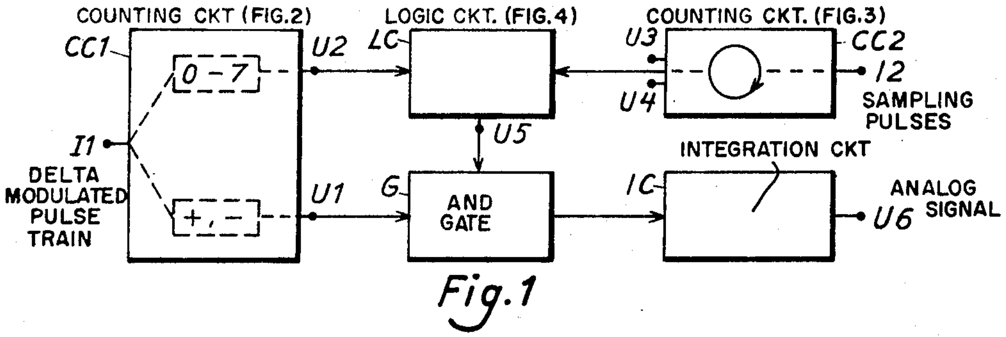

INVENTOR
Gunnar Erik William Sparrendahl
BY Hane, Baxley and Spiecens
ATTORNEYS

INVENTOR
Gunnar Erik William Sparrendahl
BY Hane, Baxley and Spiecens
ATTORNEYS

Tab. 1

| SA | | ST | | | | | | | | | | | |
|---|---|---|---|---|---|---|---|---|---|---|---|---|---|
| FF1 | K1 | 0 | 1 | 2 | 3 | 4 | 5 | 6 | 7 | 8 | 9 | A | B |
| 1 | 0 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 0 | 0 | 0 |
| 1 | 2 | 1 | 1 | 1 | 1 | 1 | 0 | 0 | 0 | 0 | 1 | 1 | 1 |
| 1 | 3 | 1 | 0 | 0 | 0 | 0 | 1 | 1 | 1 | 1 | 1 | 1 | 1 |
| 1 | 4 | 0 | 1 | 0 | 0 | 0 | 1 | 0 | 0 | 0 | 1 | 0 | 0 |
| 1 | 5 | 0 | 0 | 1 | 0 | 0 | 0 | 1 | 0 | 0 | 0 | 1 | 0 |
| 1 | 6 | 0 | 0 | 0 | 1 | 0 | 0 | 0 | 1 | 0 | 0 | 0 | 1 |
| 1 | 7 | 0 | 0 | 0 | 0 | 1 | 0 | 0 | 0 | 1 | 0 | 0 | 0 |
| 0 | 6 | 0 | 0 | 0 | 0 | 0 | 0 | 0 | 0 | 0 | 0 | 0 | 0 |
| 1 | 5 | 0 | 0 | 1 | 0 | 0 | 0 | 1 | 0 | 0 | 0 | 1 | 0 |
| 0 | 4 | 0 | 0 | 0 | 0 | 0 | 0 | 0 | 0 | 0 | 0 | 0 | 0 |
| 1 | 3 | 1 | 0 | 0 | 0 | 0 | 1 | 1 | 1 | 1 | 1 | 1 | 1 |
| 0 | 2 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 0 | 0 | 0 |
| 0 | 0 | 0 | 0 | 0 | 0 | 0 | 0 | 0 | 0 | 0 | 0 | 0 | 0 |
| 1 | 0 | 1 | 1 | 1 | 1 | 1 | 1 | 1 | 1 | 1 | 1 | 1 | 1 |

INVENTOR
GUNNAR ERIK WILLIAM SPARRENDAHL
BY Hane, Baxley and Spiecens
ATTORNEYS

MODULATOR AND DEMODULATOR RESPECTIVELY FOR USE IN ADAPTIVE DELTA MODULATION

This invention pertains to delta modulation and more particularly to adaptive delta modulation.

In delta modulation an analog signal is converted to a pulse train wherein the polarities of the pulses depend on the relationship between the instantaneous amplitude of the analog signal and the previous amplitude of such signal. At the demodulator this pulse train is synthesized to an analog signal which is roughly a replica of the original analog signal by an integrator.

Because the replication is not exact, there has been developed adaptive delta modulation systems. In a presently known system as disclosed in Swedish Pat. No. 203,323 the original delta modulated pulse train is fed via a counting circuit to the integrator. The counting circuit generates a train of constant duration pulses which have varying amplitude and polarity characteristics. The polarity of any given pulse from the counter is a function of the polarity of the pulse in the delta modulated train then being received (the instantaneous pulse), while the amplitude of such pulse is a function of a group of the pulses in the delta modulated train which precede the pulse then being received. In other words, the new pulse is adapted to the previous history of the train. While such an adaptive delta modulation scheme improves the replication process, it is still not sufficiently precise for the modulation of many analog waveforms.

It is, accordingly, a general object of the invention to provide improved adaptive delta modulation apparatus.

In general the invention contemplates converting the conventional delta modulated pulse train into a pulse train wherein each pulse has a constant amplitude, a variable polarity and a variable time duration.

It has been found that such techniques permit very precise replication of the analog waveforms.

In addition, there are further advantages.

In order to obtain a modulator-demodulator arrangement, for example in a telephone apparatus, for use in an adaptive delta modulating system, in which a modulator part T and a demodulator part R are included, the known arrangements necessitate a complete duplication of equipment. In a modulator-demodulator arrangement according to the invention this is not necessary, as certain parts are common for the modulator- and demodulator part.

Digit signalling by means of a key set in known telephone apparatus occurs within the voice frequency band with analog signals. Such a signalling can be disturbed by speech currents and is relatively expensive. In a telephone apparatus including a modulator-demodulator arrangement according to the invention for digit signalling special signalling pulse patterns are used whereby such drawbacks are eliminated.

Figure 2:
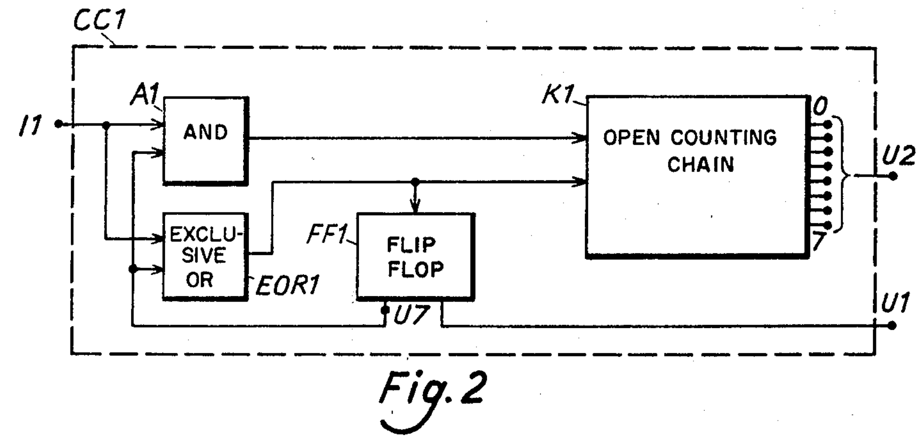
Figure 3:
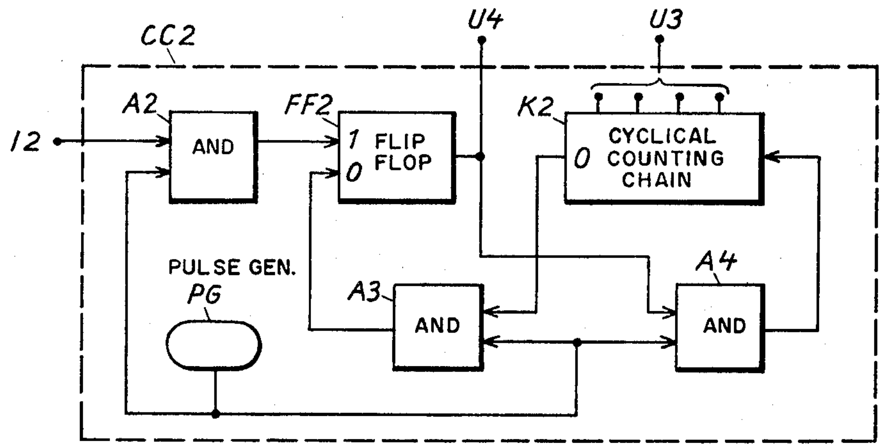
Figure 4:
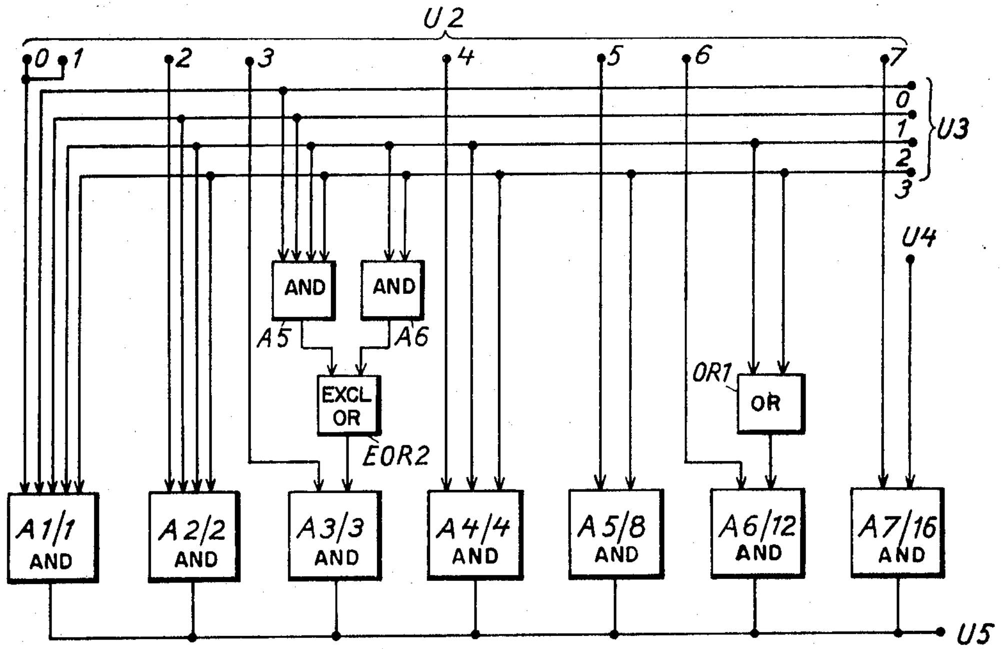
Figure 5:
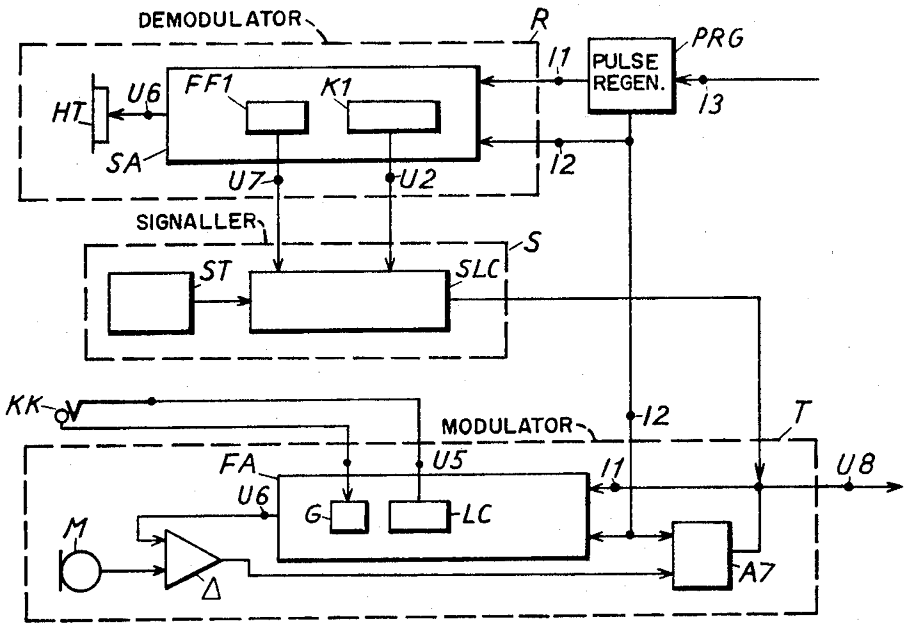
Figure 6:
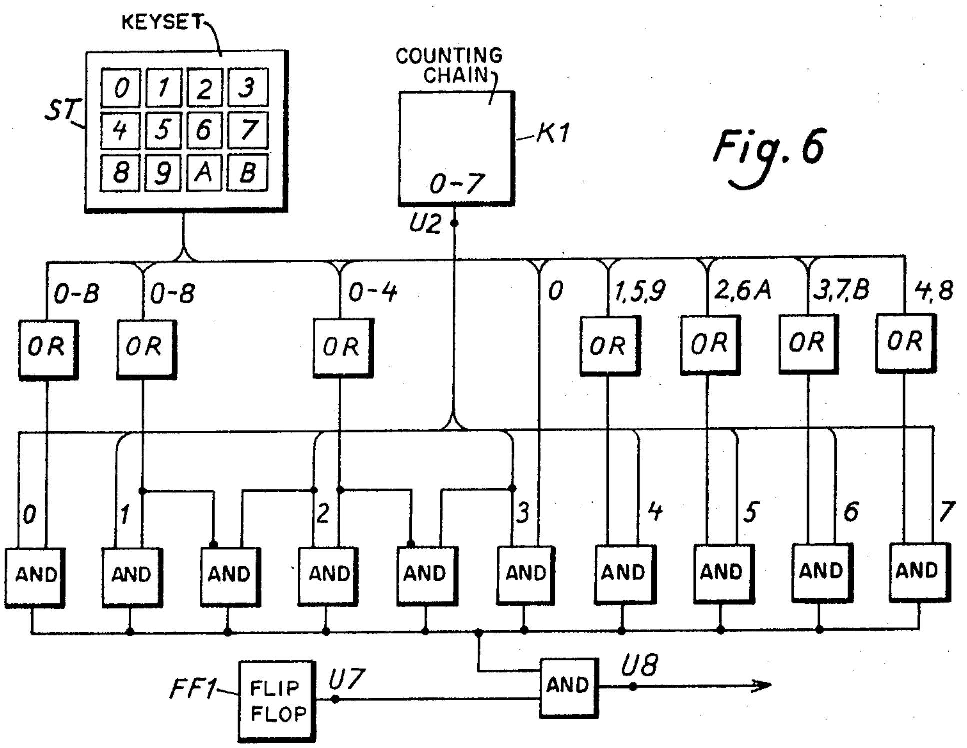

The invention is explained here below with reference to the accompanying drawing in which FIG. 1 is a block diagram of the main parts which are included both in a modulator and in a demodulator according to the invention, FIG. 2 is a block diagram of the first counting circuit CC1 of the circuit arrangement, FIG. 3 shows the second counting circuit CC2 of the circuit arrangement and FIG. 4 shows an example of a logical circuit LC in the circuit arrangement, FIG. 5 shows a fundamental circuit diagram for a telephone apparatus including a modulator-demodulator arrangement according to the invention and FIG. 6 shows a logical circuit SLC which is used for digit signalling in such a telephone apparatus.

FIG. 1 is a block diagram which shows the main parts which are included both in a modulator and in a demodulator according to the invention. The delta modulating pulse train (a series of intermixed positive and negative going pulses) is supplied via the first input I1 of the arrangement to a first counting circuit CC1, (an indicating and registering means) in which is registered the instantaneous polarity (+ or −) of the delta modulated pulses and furthermore a digit value (according to the example a digit between 0 and 7) which depends on the previous pulse pattern in the delta modulated pulse train as it will be explained more in detail in connection with FIG. 2. Such polarity and digit value registrations are unchanged during a period between two signal pulses of the pulse train and appear on outputs of the counting circuit in such a manner that one of the outputs U1 works as a current source with a constant current intensity $I_{1p)}$ and a direction which depends on the instantaneous or momentary pulse polarity and eight further outputs U2 each corresponding to one of the digit values 0–7.

A second counting circuit CC2 which is described more in detail in FIG. 3 and to which, via the second input I2 of the arrangement, sampling pulses are supplied which define said periods between two signal pulses, carries out during a pulse period a counting cycle divided in a number of time units and activates different outputs U3, U4 in correspondence to its counting position. These outputs can be combined in order to form a signal during a desired number of time units as it will be explained in connection with FIG. 4.

The outputs of the second counting circuit CC2 and the outputs of the first counting circuit which correspond to said defined digit values, are connected to a logical circuit LC, of which an embodiment is shown in FIG. 4. The function of said logical circuit is that according to a definite code it associates with each digit value in the first counting circuit CC1 a definite time period consisting of a definite number of time units, so that the output U5 of said logical circuit is activated during time periods $t_{1pm)}$ which are dependent on the previous pulse pattern in the delta modulated pulse train.

The output U1 of the first counting circuit which works as current source and the output U5 of the logical circuit are connected to an AND-gate G, the output of which is connected to an integration circuit IC. The integrator circuit can be a signal integrator which in its simplest form can be a capacitor. In this manner the integration circuit is supplied with said current-time product $I_{1p)} \, x \, t_{1pm)}$ in order to build up a synthetic signal in a manner known per se.

FIG. 2 shows more in detail the first counting circuit which includes an AND-circuit A1 and an EXCLUSIVE-OR -circuit EOR1. The delta modulated pulse train is supplied through said input I1 to an input of AND-circuit A1 and EXCLUSIVE -OR-circuit EOR1. Which of the two circuits will be activated depends on the condition of a bistable flip-flop circuit FF1. Circuit FF1 acts as a one stage binary counter which has a first condition indicating output U7 connected to a second input of AND-circuit A1 and furthermore to EXCLU- SIVE-OR-circuit EOR1. If the momentary delta modulated pulse (the pulse then present at input I1) has a polarity which corresponds to the condition of the flip-flop circuit, the AND-circuit A1 is activated. If on the other hand the polarity of the momentary pulse does not correspond to the condition of the flip-flop circuit, the EXCLUSIVE-OR-circuit is activated. The flip-flop circuit has its control input connected to the output of the EXCLUSIVE-OR-circuit EOR1, so that the flip-flop circuit FF1 always registers the momentary pulse polarity and can, via a second current supply output constituting said output U1 in the counting circuit, supply a constant current $I_{1p)}$ with a direction or polarity dependent on the registered polarity.

The first counting circuit CC1 includes furthermore a counting chain K1 (an up-down counter), in which a first input is connected to the output of the AND-circuit A1 and a second input is connected to the output of the EXCLUSIVE-OR-circuit EOR1. The counting chain works in such a manner that it steps forwards if it obtains a pulse from the AND-circuit, i.e. if the momentary pulse has the same polarity as the previous and that it steps backwards if it obtains a pulse from the EXCLUSIVE-OR-circuit, i.e. if the momentary pulse has opposite polarity against the previous. The counting chain is not of the cyclical type which means that it stops at its highest digit value, even if it should obtain a new pulse from the AND-circuit and it stops at its lowest digit value even if it should obtain a new pulse from the EXCLUSIVE-OR-circuit. In this manner the counting chain registers a digit value (e.g. 0–7 when using a three-bit-counter) in dependence on the previous pulse pattern. The outputs of the counting chain correspond to the further eight outputs U2 in the first counting circuit, each corresponding to one of the digit values 0–7.

FIG. 3 shows more in detail the arrangement of the second counting circuit. Three AND-circuits A2, A3, A4 have each a first input connected to a pulse generator PG with the pulse frequency $f_0$. The second input of the AND-circuit A2 constitutes the input I2 of the second counting circuit to which sampling pulses with the frequency $f_s$ are supplied which are obtained from the delta modulated pulse train. The output of the AND-circuit A2 is connected to a ONE-setting input of a bistable flip-flop circuit FF2 (a set-reset flip-flop). The ZERO-setting input of the flip-flop circuit is connected to the output of the AND-circuit A3 in whose second input is connected to an output of a counting chain K2 of the cyclical type (ring counter), which output becomes activated upon the ZERO-setting of the counting chain of cyclical type.

In this manner the ZERO-setting of the counting chain K2 releases also the ZERO-setting of the flip-flop circuit. The AND-circuit A4 has its second input connected to the output of said bistable flip-flop circuit FF2 and its output connected to the input of the counting chain K2 so that each sampling pulse at input I2 releases, via the flip-flop circuit FF2 the start of a counting cycle during which the counting chain is advanced one step by each pulse from the pulse generator PG. The pulses from the pulse generator need not to be synchronized with the sampling pulses. It is only presupposed that the counting chain with security terminates a counting cycle within a pulse period of the sampling frequency. If for example a four-bit-counter is chosen this is fulfilled for $f_0 > 16 \times f_s$.

The bit-outputs U3 from the counting chain K2 constitute together with the output U4 from the flip-flop circuit FF2 the outputs of the second counting circuit CC2, which in combination with outputs U2 of the first counting circuit CC1, each corresponding to a definite digit value, give the possibility to form in a logical circuit LC time periods consisting of definite numbers of time units according to a desired quantization code, for example Digit value in the first counting circuit 0 1 2 3 4 5 6 7

Quantization steps (number of time units) 1 1 2 3 4 8 12 16

A logical circuit LC according to FIG. 4 carries into effect this quantization code. In the embodiment the logical circuit has thirteen inputs of which eight are connected to said outputs U2 of the first counting circuit CC1 corresponding each to a definite digit value 0–7, and five are connected to U3 and U4 of the second counting circuit CC2. The logical circuit LC includes seven main-AND-circuits A1/1, A2/2 A7/16 with a common output which constitutes the output U5 from the logical circuit. The circuit A1/1 has an input connected to the O-output as well as to the 1-output of the first counting circuit and each of the remaining six main-AND-circuits have an input connected to an output of the first counting circuit corresponding to a definite digit value 2–7. The remaining inputs of the seven main-AND-circuits are connected to the respective outputs from the second counting circuit CC2, so that the activating time periods follow the quantization code. In the AND-circuit A6/12 this is obtained via an OR-circuit OR1, and in the AND-circuit A3/3 via 2 AND-circuits A5, A6 and an EXCLUSIVE-OR-circuit EOR2.

FIG. 5 shows a fundamental circuit diagram of a digital telephone apparatus in which a modulator-demodulator arrangement according to the invention is used. The telephone apparatus comprises a pulse regenerator PRG, a modulator part T, a demodulator part R and a signalling part S.

The purpose of the pulse regenerator PRG is to form the pulses supplied via the input I3 of the telephone apparatus and to supply the regenerated pulse train from a first output to an input I1 of the demodulator part. Moreover the pulse regenerator produces sampling pulses with frequencies $f_s$ and supplies these from a second output to inputs I2 of the demodulator- and modulator part.

The modulator part comprises besides the main parts FA shown in FIG. 1 a microphone M, a differential amplifier Δ and an AND-gate A7 for generating the delta modulated pulse train in a manner known per se. If in said main parts FA the output U5 of the logical circuit LC is connected to the gate G via the cradle contact KK of the telephone apparatus, as indicated in FIG. 5, marking of the position of the cradle contact always can be obtained in the exchange. An idle telephone apparatus, i.e. an open cradle contact, gives pulses of only one polarity. If on the other hand the handset is lifted, i.e. if the cradle contact is closed, pulses of alternating polarity are obtained on the output U8 of the telephone apparatus.

The demodulator part comprises besides the main parts SA shown in FIG. 1 an earphone HT which is connected to the output U6 of main parts SA. It is not necessary that both the modulator- and demodulator part include a second counting circuit CC2, which means an essential simplification for the telephone apparatus. This possibility of simplification is not shown in FIG. 5.

The signalling parts comprises a key set ST provided with e.g. 12 keys and a logical circuit SLC with a number of OR-and AND-circuits. FIG. 6 shows a possible arrangement of the signalling parts at the telephone apparatus according to FIG. 5. The inputs at logical circuit SLC are activated by the key set ST, by the outputs U2 of the counting chain K1 of the demodulator part registering a digit value 0–7 and by the condition indicating output U7 of the flip-flop circuit FF1 of the demodulator part. Said outputs used for signalling are indicated in the demodulator part of FIG. 5 and are found in FIG. 6.

Upon signalling the exchange transmits a signalling pulse train, the pulses of which step the counting chain K1 in the demodulator part periodically up and down:

signalling pulse train (in FF1) 0 1 1 1 1 1 1 1 1 0 1 0 1 0 1 0 1 1 digit value in the first 0 0 1 2 3 4 5 6 7 6 5 4 3 2 1 0 0 1 counting circuit

The output of the logical circuit in the signalling part constitutes as well as the output of the modulator part the output U8 of the telephone apparatus. In this manner, when each key is operated a periodic pulse pattern according to table 1 is transmitted. Neither said received signalling pulse train nor said transmitted periodical pulse pattern according to table 1 gives audible frequencies or can be disturbed by speech frequencies.

We claim:

1. In a delta modulation system wherein an analog signal is represented by a delta modulated pulse train of a coded series of pulses of first and second polarities, adaptive apparatus for processing the delta modulated pulse train to an adaptive delta modulated pulse train comprising an input means adapted to receive the delta modulated pulse train, indicating and registering means for indicating the polarity of each pulse received by said input means and for registering a representation of the polarities of a group of pulses preceding the instantaneous pulse received by said input means, variable-characteristic pulse generating means connected to said indicating and registering means for generating a pulse having a polarity related to the polarity indicated by said indicating and registering means and a duration related to the representation registered by said indicating and registering means, and signal integration means connected to said variable-characteristic pulse generating means.

2. The apparatus of claim 1 wherein said indicating and registering means comprise logic means adapted to receive the delta modulated pulse train for generating a first pulse when the polarity of the received pulse is of a first polarity and generating a second pulse when the polarity of the received pulse is of a second polarity, and an open up-down counter connected to said logic means for counting in one direction upon receipt of each of said first pulses, counting in the opposite direction upon receipt of each of said second pulses and for storing up to a maximum value in either direction the representation of an instantaneous count.

3. The apparatus of claim 2 wherein said logic means include a polarity indicating means having an output for transmitting a polarity indicating signal which changes polarity each time there is a difference in the polarity between adjacent receipt pulses of the delta modulated pulse train.

4. The apparatus of claim 3 wherein said polarity indicating means is a bistable flip-flop means having an input and an output means, said flip-flop means changing state each time a pulse is received at its input and said logic means includes an AND-circuit means having an output for transmitting said first pulses, a first input adapted to receive the delta modulated pulse train and a second input connected to the output means of said bistable means, and said logic means further includes an exclusion-or-circuit means having an output for transmitting said second pulses and being connected to the input of said flip-flop means, a first input adapted to receive the delta modulated pulse train and a second input connected to the output means of said flip-flop means.

5. The apparatus of claim 1 wherein said indicating and registering means include a polarity signal generating means for generating a signal having a polarity related to the polarity of a received pulse of the delta modulated pulse train and wherein said variable-characteristic pulse generating means comprise variable width pulse generating means for generating pulses having durations related to the representation registered in said indicating and registering means but less than the period of a pulse in the delta modulated pulse train, a gating means having one input connected to said variable width pulse generating means, a second input connected to said polarity signal generating means, and an output connected to said integrator means.

6. The apparatus of claim 5 wherein said indicating and registering means include means for generating representation signals associated with the registered representations of the polarities and wherein said variable width pulse generating means include a pulse generator for generating pulses at a rate which is a multiple of the pulse repetition rate of the delta modulated pulses, a recycling counter means for cyclically counting the pulses from said pulse generator and generating count signals related to the instantaneous count, and logic circuit means for logically operating on said count signals and representation signals.

7. The apparatus of claim 1 further comprising a speaker connected to said signal integration means.

8. The apparatus of claim 1 further comprising a difference amplifier having first and second inputs and an output, a microphone connected to one of said inputs, said signal integration means connected to the other of said inputs, and means for connecting the output of said difference amplifier to said input means.

9. The apparatus of claim 1 wherein said indicating and registering means include a polarity signal generating means for generating a polarity signal having a polarity related to the polarity of a received pulse of the delta modulated pulse train and wherein means are included for generating signals related to the registered representation and further comprising a special pulse train generator, said special pulse train generator including a key set for generating digit signals, and a logic network means receiving the digit signals from the keyset, the signals related to the registered representations and the polarity signal from said indicating and registering means for operating on said signals to generate special pulse trains in accordance with the operation of keys of said key set.

* * * * *